United States Patent
Dableh

(10) Patent No.: US 10,021,771 B1
(45) Date of Patent: Jul. 10, 2018

(54) SYSTEM AND METHOD FOR AUTOMATICALLY CREATING AND OPERATING A FUNCTIONAL ASSOCIATION OF LIGHTS

(71) Applicant: JDRF Electromag Engineering Inc., Oakville (CA)

(72) Inventor: Roumanos Dableh, Oakville (CA)

(73) Assignee: JDRF ELECTROMAG ENGINEERING INC., Oakville (CA)

( * ) Notice: Subject to any disclaimer, the term of this patent is extended or adjusted under 35 U.S.C. 154(b) by 0 days.

(21) Appl. No.: 15/584,678

(22) Filed: May 2, 2017

(51) Int. Cl.
  *H05B 37/02* (2006.01)
  *F21V 23/04* (2006.01)
  *H05B 37/03* (2006.01)

(52) U.S. Cl.
  CPC ....... *H05B 37/029* (2013.01); *F21V 23/0442* (2013.01); *F21V 23/0471* (2013.01);
  (Continued)

(58) Field of Classification Search
  CPC ............ H05B 37/0272; H05B 37/0227; H05B 37/0245; H05B 37/034; H05B 37/0218;
  (Continued)

(56) References Cited

U.S. PATENT DOCUMENTS 6,963,549 B1 * 11/2005 Jayaraman ............ H04W 28/18
370/328
8,346,376 B2   1/2013 Engelen et al.
(Continued)

FOREIGN PATENT DOCUMENTS

AU   20113164520   4/2012
CN   101869004   10/2010
(Continued)

*Primary Examiner* — Vibol Tan
(74) *Attorney, Agent, or Firm* — DLA Piper LLP (US)

(57) ABSTRACT

A system and a method for automatically creating and operating a functional association of multiple devices is proposed. The system consists of two or more devices that each contain one or more sensors, logic processing circuitry and communication circuitry that is able to transmit messages on a free space optical or radio frequency communication channel The set of devices that constitute the members of a functional association is selected from a larger set of candidate devices. The selection process involves each device performing analysis of the historic sensor data received from all candidate devices against specific evaluation criteria. The evaluation criteria is based on a probabilistic model that predicts the effectiveness of a possible functional association in accomplishing a joint task. Devices whose historic data indicate that they have high degree of effectiveness of achieving a task if they operate in unison will become members of the same functional association. Subsequently, they will continually exchange data in real time in order to operate in unison. The transmission of historic data needed to form the functional association and subsequent operating data needed to synchronize operation is done on a decentralized and unsupervised basis. It does not require a network-based logical addressing scheme and it does not require any special wiring or the use of a distributed, localized or centralized control unit. Membership in a functional association is dynamic and automatically responds to the addition or removal of candidate devices.

18 Claims, 6 Drawing Sheets

(52) U.S. Cl.
CPC ......... *H05B 37/02* (2013.01); *H05B 37/0218* (2013.01); *H05B 37/0227* (2013.01); *H05B 37/0254* (2013.01); *H05B 37/0281* (2013.01); *H05B 37/034* (2013.01)

(58) Field of Classification Search
CPC ............ H05B 33/0857; H05B 33/0845; H05B 33/0863; H05B 33/0869; Y02B 20/48; Y02B 20/46; F21S 8/086; F21S 2/00; F21V 23/0442; F21W 2131/103; F21W 2111/02; F21Y 2115/10; F21Y 2113/13; E06B 2009/6827; H04L 41/0803
See application file for complete search history.

(56) References Cited

U.S. PATENT DOCUMENTS

| | | | | |
|---|---|---|---|---|
| 8,638,036 B2 * | 1/2014 | Delnoij | ............. | H05B 37/0218 315/149 |
| 8,742,694 B2 * | 6/2014 | Bora | ................. | H05B 33/0863 315/113 |
| 8,810,359 B2 * | 8/2014 | Campbell | ............... | H04W 4/04 340/4.21 |
| 8,872,432 B2 * | 10/2014 | Kercso | ............... | H05B 37/0227 315/152 |
| 9,215,775 B1 | 12/2015 | Lunn et al. | | |
| 9,226,370 B2 * | 12/2015 | Berkvens | ........... | H05B 37/0272 |
| 9,538,625 B2 * | 1/2017 | Szabados | ........... | H05B 37/0254 |
| 9,655,207 B2 * | 5/2017 | Monaci | ............... | H05B 37/0227 |
| 9,730,298 B2 * | 8/2017 | Vangeel | ............... | H05B 37/0245 |
| 9,788,400 B2 * | 10/2017 | Flinsenberg | ........... | H05B 37/03 |
| 9,807,842 B2 * | 10/2017 | Ivey | ................... | H05B 33/0854 |
| 2011/0089841 A1 | 4/2011 | Radermacher et al. | | |
| 2012/0059622 A1 | 3/2012 | Cacace et al. | | |
| 2014/0072119 A1 * | 3/2014 | Hranilovic | ........... | H04L 9/3215 380/270 |
| 2015/0120246 A1 * | 4/2015 | Shrubsole | .......... | H05B 37/0245 702/182 |
| 2016/0286627 A1 * | 9/2016 | Chen | .................. | H05B 37/0245 |
| 2016/0286629 A1 * | 9/2016 | Chen | .................. | H05B 37/0272 |
| 2017/0105269 A1 * | 4/2017 | Balasubramainian | | H05B 37/0227 |
| 2017/0127496 A1 * | 5/2017 | Pandharipande | .. | H05B 37/0218 |
| 2017/0223811 A1 * | 8/2017 | Vangeel | ........... | H05B 37/0272 |
| 2017/0231071 A1 * | 8/2017 | Elinsenberg | ........... | H05B 37/03 |

FOREIGN PATENT DOCUMENTS

| | | |
|---|---|---|
| CN | 102273323 | 12/2011 |
| WO | WO 2014/147510 | 9/2014 |

* cited by examiner

SYSTEM AND METHOD FOR AUTOMATICALLY CREATING AND OPERATING A FUNCTIONAL ASSOCIATION OF LIGHTS

TECHNICAL FIELD

This invention relates to the installation and maintenance of luminaires. More specifically, the invention relates to the control of luminaires in groups.

BACKGROUND

Light management system (LMS) may use a functional association of luminaires. Such an association may include luminaires associated based on for example daylight harvesting or occupancy detection. Some existing light management systems may use low voltage wiring or a logical addressing scheme to control a group of associated luminaires. Low voltage wiring connecting each of the luminaires in the association determines membership of devices in a functional association by physically connecting all member devices together on a common channel.

Logical addressing schemes may be used in digital LMS (wired or wireless) to define membership in a functional association. Setting up a digital LMS typically requires devices that are first distinguished from one another by causing them to produce a visual pattern that is noticeable by a technician. Software is then used to read the unique identifier of a visually distinguishable device to correlate the identifier to one or more physical devices. Once identified, each device is manually added to one or more functional associations.

This is a prescriptive process whereby the correlation of devices depends on a logical network address to map devices to the same functional association. During operation, the logical address is encoded in the communication signal according to rules set by the communication protocol. Logical address types may include broadcast, multi-cast and uni-cast addresses used to transmit data to all nodes, a group of nodes or a unique node connected to a network, respectively.

Every device that receives the communication message may then determine whether or not to process and respond to the message based on its membership in the given logical address type.

Building automation systems may include LMS in addition to other systems such as HVAC (heating, ventilation and air conditioning) and shading. Such systems may have a common control systems, share user interfaces and share sensors and feedback mechanisms.

Although existing systems may provide some control over LMS, they may not provide optimal, efficient setup and control.

SUMMARY

A light management system is described that comprises two or more light fixtures in communication with each other. The light fixtures track one or more sensors or inputs, such as occupancy. Patterns of inputs are compared with neighbouring light fixtures and light fixtures with common patterns of inputs are grouped. Grouped light fixtures operate as a group, such as by turning off and on as a group.

BRIEF DESCRIPTION OF THE DRAWINGS

In drawings which illustrate by way of example an embodiment.

DETAILED DESCRIPTION

A functional association is a collection of multiple devices that work together in order to achieve a specific objective. Member devices may share input data, run processing algorithms and coordinate their output state. Automation object refers to a control device and one or more illumination elements or luminaires.

In the context of a LMS, a functional association relates to lights or luminaires and associated sensors. As an example, a functional association may consist of a sensor that detects occupancy and the luminaire(s) that respond to the state of the sensor. In this example, the shared input data is the state of the sensor, which can be in an occupied or a vacant state. The desired objective is for all luminaire(s) to respond simultaneously to changes in the sensor state. The response may be as simple as setting the output state of the luminaires to light levels of 100% and 0% for the occupancy and vacancy, respectively. The response may be more complex, involving transition levels, vacancy warnings and a variable fade time.

Figure 1:
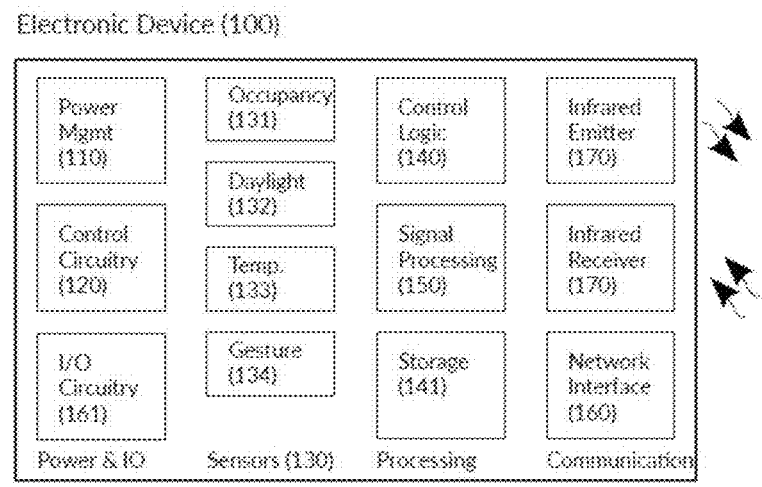
FIG. 1 is a schematic view of a luminaire control device.

FIG. 1 is a schematic view of a luminaire control device that automatically creates functional associations using infrared data transmission on a decentralized network in accordance with one embodiment. The luminaire control device may operate and control one or more luminaires. A luminaire may comprise a luminaire control device, one or more illumination element such as LEDs or bulbs, and fixtures or housing. The control device may be in the same housing as the rest of the components of the luminaire, but may alternatively be next to or connect to the luminaire.

Luminaire control device 100 may comprise one or more of the following sub-systems: power management circuitry 110, control circuitry 120, various sensors 130, including but not limited to occupancy sensor 131, daylight sensor 132, temperature sensor 133 and gesture sensor 134, control logic processing 140, data storage and memory 141, digital signal processing 150, network communication interface 160, input interface 161, and visible or infrared communication circuitry 170.

In an embodiment, luminaires and associated sensors form a functional association without using wiring connections or manually using network addresses to assign luminaires to membership in the functional association.

Luminaires may do so by sharing data between control devices 100 on a communications channel. The communications channel may be a free space optical communication channel using visible or near infrared light. In some embodiments, the data may be shared on wired networks such as Ethernet, or another lower power wired network. The data may be shared on a wireless network using Bluetooth, Wi-Fi or similar technology, in addition to the optical communications mentioned above.

The luminaires may communicate with other aspects of a LMS such as a central controller, manually operated light switches, as well as other building automation devices such as HVAC components and third party devices. Signals from some of these devices may constitute high priority signals which override luminaire device control. For example, the operation of a manually operated light switch, or dimmer switch may override occupancy or daylight sensors. The communication media may be a hybrid system with different devices communicating on different networks interconnected by interfaces or through interconnecting devices.

Luminaire data, such as historical sensor data, luminaire output levels and control data may be shared between luminaires. Control data may include coefficients for PID (proportionate-integrate-differential) controls. The data for a luminaire may be encoded in the communication signal produced by the control device.

A control device that receives the communication signal may analyze the luminaire data of the transmitting control device. More than one control device may receive the signals and data. Data received by a device may be compared it to its own data, including historical sensor data and control data.

Two or more control devices and their luminaires may form a logical association based on common patterns contained in the historical data. Devices may form a logical association and their operation will be synchronized only for devices where the datasets meet a function specific evaluation criteria.

The similarity criteria may continually be evaluated in real time to achieve dynamic membership in the functional association. In this embodiment, devices will remain synchronized while their luminaire data continues to meet the similarity criteria and will automatically exit the functional association when this criteria is not met.

Figure 2:
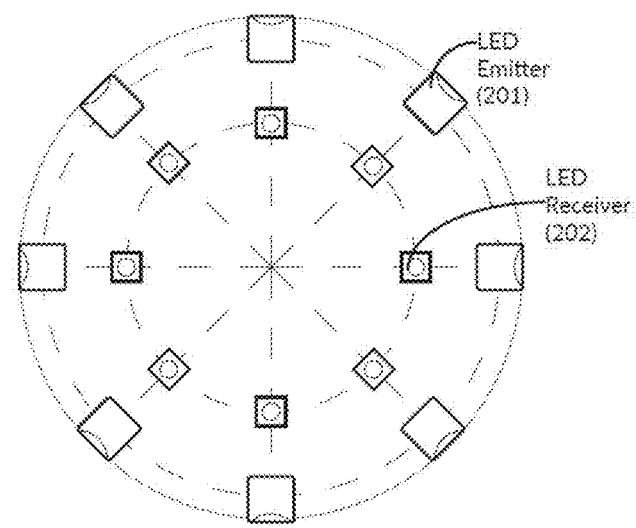
FIG. 2 is a bottom view of a transceiver for a luminaire control device of FIG. 1.

FIG. 2 illustrates one embodiment of the free space optical communication circuitry 170. Transmitter 200 may consist of one or more infrared LED emitters 201 and one or more infrared LED receivers 202. The emitters and/or receivers may be arranged in a radial distribution pattern. The infrared LED receivers may consist of a photo diode tuned for the visible or near infrared wavelengths of light being emitted by the emitters. The emitter or emitters on transmitter 200 may emit light in all directions to reach a receiver or receivers located on another control device 100. The emitter may communicate on a line-of-sight directed link, a directed non-line of sight link or a diffuse link.

Figure 3A:
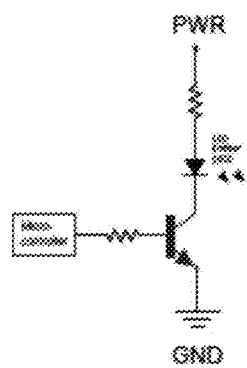
FIG. 3A is a circuit diagrams for transmitting signals.

With reference to FIG. 3A, an emitting circuit may consist of an emitter 301, comprising an infrared LED, and a micro-controller capable of producing a communication signal. Resisters and transistors may be used to apply suitable power to the emitter 301.

Figure 3B:
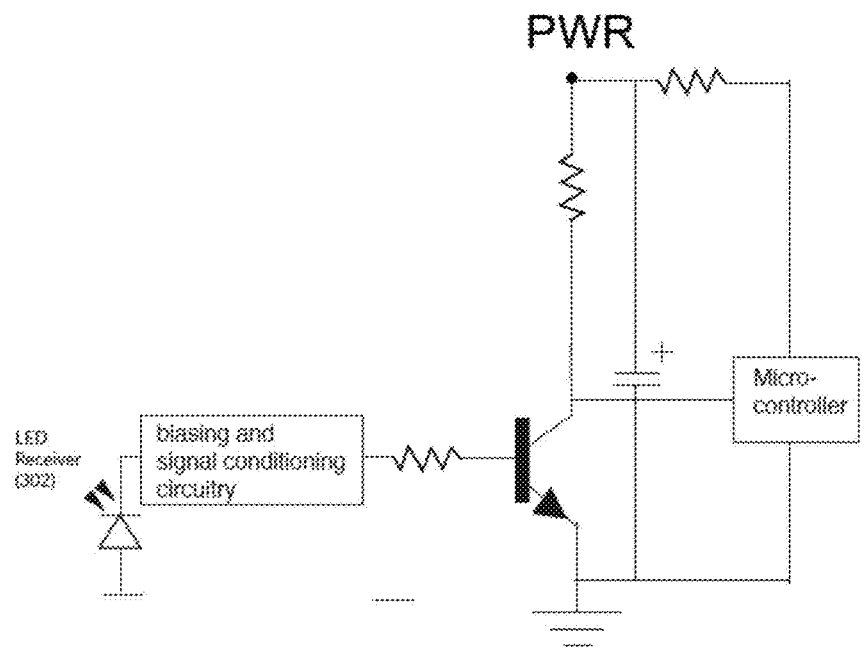
FIG. 3B is a circuit diagram for receiving signals.

With reference to FIG. 3B, the receiving circuit may comprise a receiver 302 such as a photosensitive diode, and a micro-controller, capable of receiving a communication signal. Emitter 301 and receiver 302 can additionally include any circuitry operative to control, produce and receive infrared communication signals, including timing circuitry, filters and processing circuitry.

Figure 4:
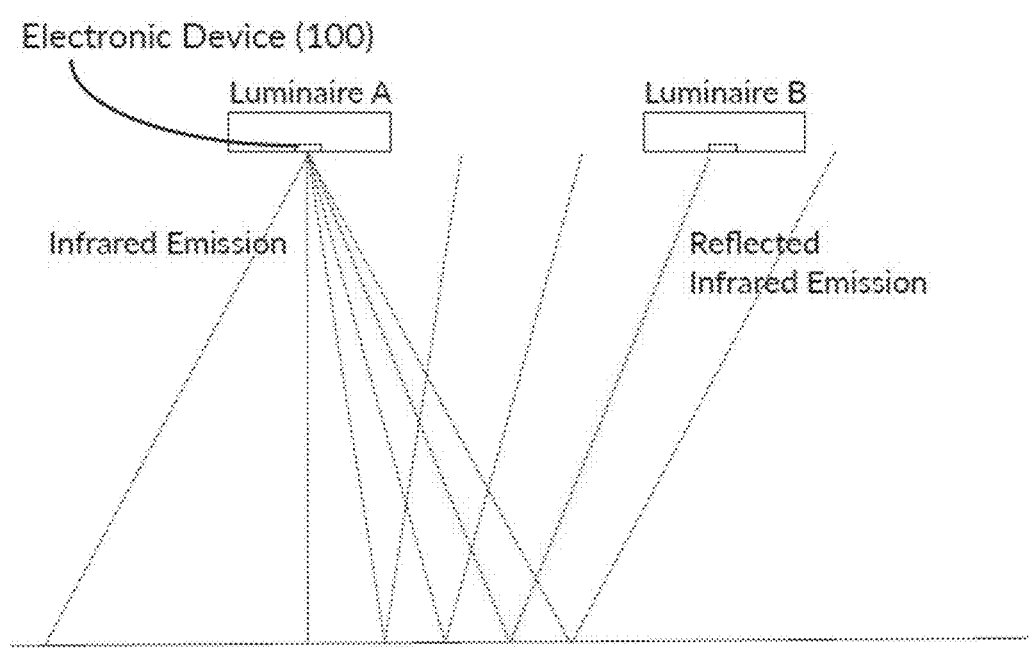
FIG. 4 is a schematic view of two luminaires indicating the transmission and receiving of infrared signals.

With reference to FIG. 4, two instances of control devices 100 are shown in proximity to each other. Each control device may be on, within, or connected with a luminaire. In an embodiment, the two control devices may communicate using an infrared diffuse link. This link may include infrared signals reflecting off the ground or floor to reach the second device. Both devices may be equipped with an emitter and receiver to allow two-way communications. While two devices are shown, but multiple devices may communicate simultaneously or multiple devices may receive signals from a single device.

Figure 5A:
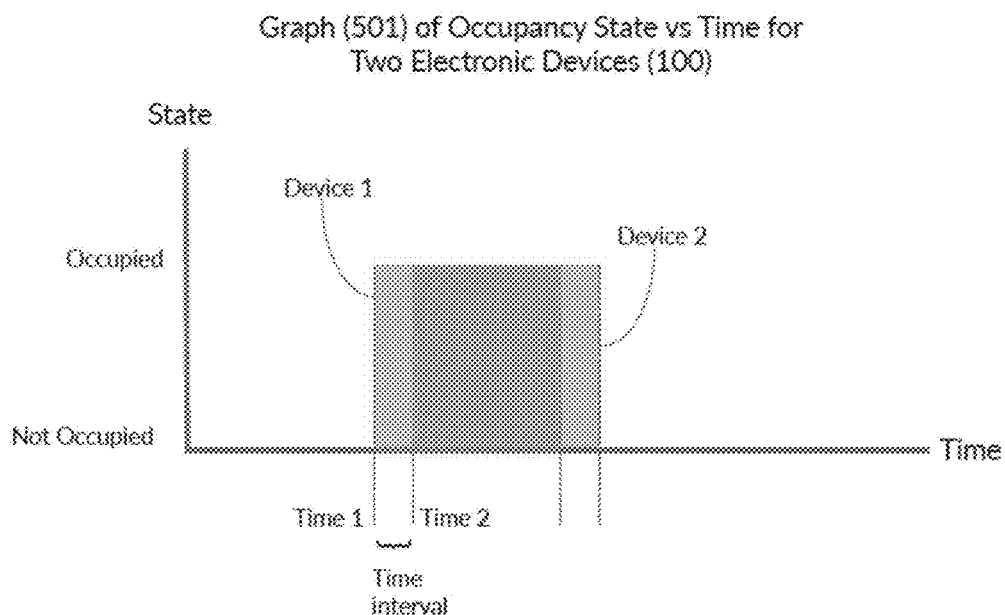
FIG. 5A is a representation of the occupancy detected for two luminaire control devices.

With reference to FIG. 5A, a graph that represent an example of the time-value pair of occupancy readings for two devices is shown. The time interval between occupancy events may be used in the analysis by both devices to determine membership in a functional association.

The historic data may represent a sequence of historic time values when occupancy was detected by a given device. For example, this may include a list of the times when occupancy was detected and when non-occupancy was detected or the start and end times for when occupancy was detected. The historical data may include the time values for the last several days, weeks, months or even longer. The data may be stored at each device in memory 141 associated with the control circuity 120 of the device 100.

The sensor data may be stored in storage 141 on a control device. Such storage may comprise volatile or non-volatile memory. The control circuitry 120 may record each change in sensory value, such as occupancy, or the state of the sensor periodically and store the state with the time in the memory.

Another device that receives the luminaire data from a neighbouring control device may compare the data with its own luminaire data. This luminaire may include its own local historic occupancy detection time values. With reference to FIG. 5A, the occupancy detection of a first device is shown overlaid with the occupancy of a second device and indicates that the second device detected occupancy a short time later than the first device by the time interval indicated.

Control devices may share their luminaire data with the neighbouring devices. This may be done by determining the signal strength of nearby devices and implementing a cut-off power level to determine devices that communication with a suitably strong signal, and therefore are likely close by. Using a free-space communication system such as visible or infrared light may be used which physically limits the distance of the communications. Alternatively, neighbouring devices may be manually or automatically determined based on the floor plan and communicated to all the devices.

The control devices may use a protocol for resolving conflicts on the transmission media. For example, the devices may pause transmission when a conflict is detected and resume a period of time later if no other device is transmitting at that time.

The devices may join the same functional association if the time values of each occupancy detection event within the sequences occur within a specific margin of time. The margin can be variable and dynamic and can be automatically tuned on-site using a variety of machine learning algorithms in order to use the most optimized setting for the operating conditions. A different weighting score can be assigned to each entry in the historic sequence to allow for more emphasis to be placed on certain time entries, such as the most recent entry, than others. This paradigm for determining membership in a functional association is based upon the similarity of historic data that is shared on a decentralized network of control devices.

A device that receives data from and shares data with two or three nearby devices, for example will compare all the historic data from the other devices with its own data to determine which of the neighbouring devices have similar sequences. It may form a functional association with some, all or none of the nearby devices.

Figure 5B:
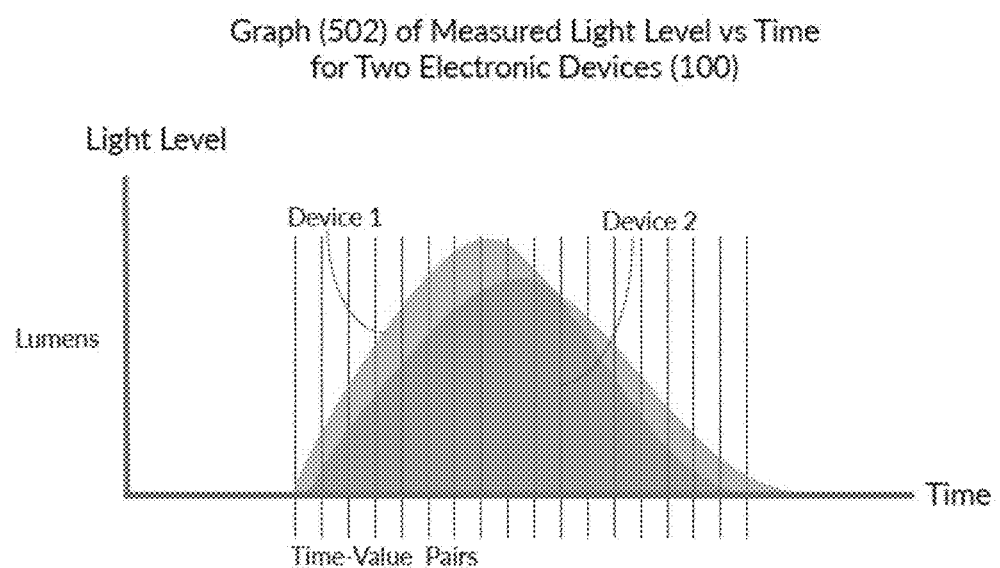
FIG. 5B is a representation of the measured light levels for two luminaire control devices.

With reference to FIG. 5B, a graph represents an example of the time value pair for a set of daylight readings for two luminaires. The difference in light levels at each time interval is used in the analysis by both luminaires to determine membership in a functional association. The graph in FIG. 5B indicates the lumens, or light intensity, detected by light sensors for each of the devices, such as over a period of a day. The graph indicates that the first device detected a higher amount of light in the first part of the time period represented, while the second device detected more light in the second part of the time period. Each time-value pair may have a different weighting factor in order to place a higher degree of priority on specific data sets within the current and historic record. For example, recent time entries or time entries during office hours may be given a higher priority.

Devices may use fuzzy logic, machine learning algorithms or are a fixed set of rules for determining the closeness of the historical data and therefore the membership in a functional association.

Devices with similar day light detection values may form a functional association and coordinate light levels of the luminaire. For example, all the control devices within the functional association may use the light sensor input from one of the devices, the control devices may share the same coefficients for PID algorithms or all the control devices may set the same output level as each other.

Figure 6:
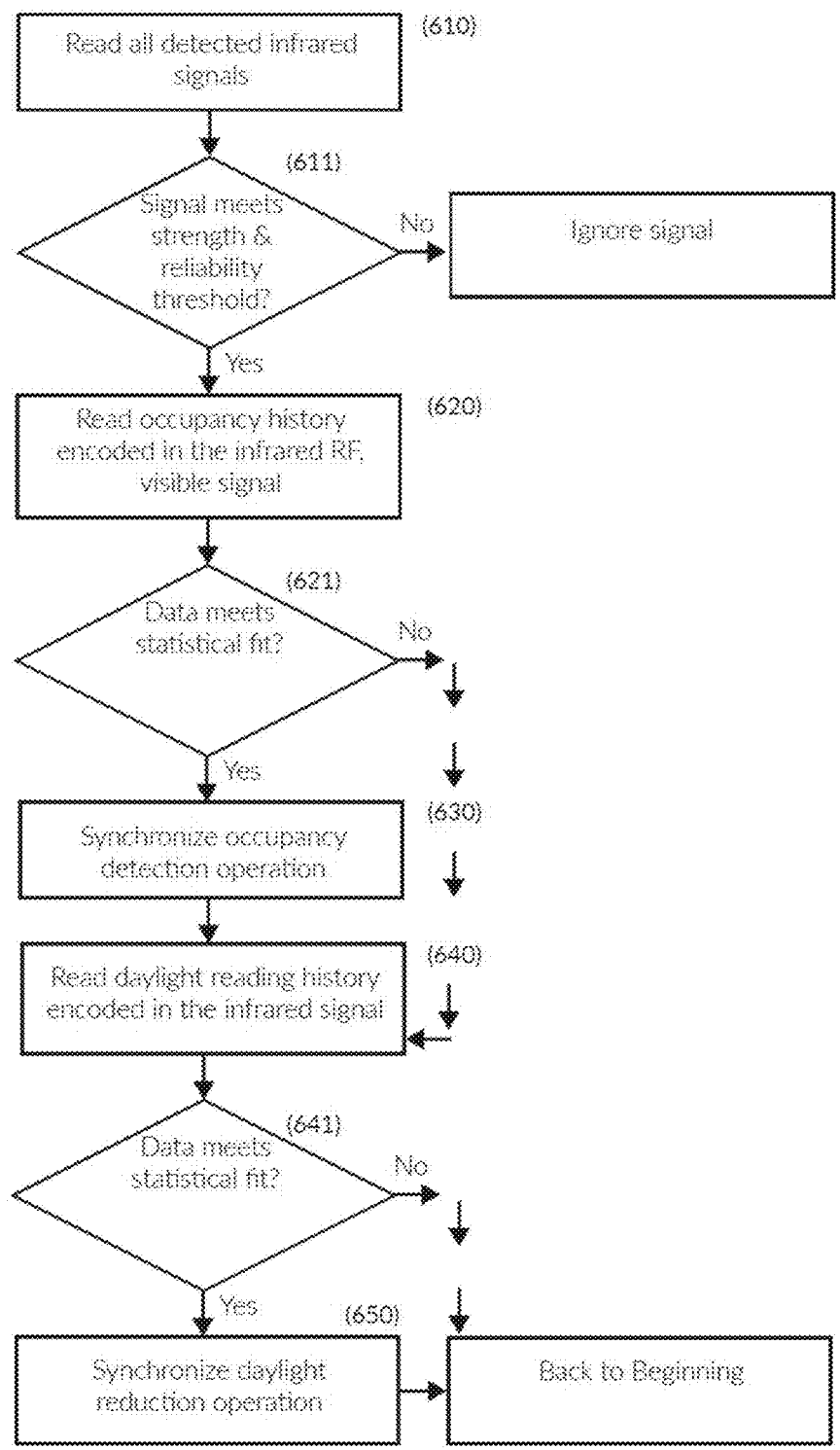
FIG. 6 is a flow chart for establishing grouped luminaires from occupancy and daylight detection.

FIG. 6 is a flow chart for a high level process that may be used for receiving, processing and forming a functional association with one or more other devices. Process 600 may be performed by control device 100.

Process 600 may begin with block 610. At block 610, communication signals received by control device 100 are read and analyzed. Such communication signals may be received by infrared transceiver. At block 611, a decision is made on whether or not the received signal meets physical criteria based on a variable threshold, such as the signal being too weak or has too much noise. If known, from identifiers or other parameters of or in the signal, the control device may be determined if the signal originates with a neighbouring device.

At block 620, signals that meet the physical criteria may be decoded as luminaire data from a neighbouring device and for data that relates to occupancy detection, the time-value pair of the occupancy data encoded within the signal may be read and analyzed. This may include current and historical data from a neighbouring device.

In block 621, a decision is made for occupancy detectors as to whether or not the time-value pair meets a variable set of similarity criteria of the historic record of occupancy events.

At block 630, control devices that meet historic similarity criteria for occupancy may synchronize their operation to behave in unison. This may mean that all devices in the functional association are set to the occupied state if any one device in the functional association detects occupancy and that no device in the functional association is set to the vacancy state until all devices in the functional association detect vacancy. In this way, for example, the luminaires in the functional group may all turn on simultaneously if any of the occupancy detectors detect occupancy and may all turn off simultaneously once none of the detectors in the functional association detect occupancy. As mentioned above, the behaviour may be more complicated with, for example, hold times and transition fades.

At block 640, signals that meet the physical criteria may be decoded and the time-value pairs of daylight sensor data encoded within the signal are read and analyzed for control devices that utilize daylight sensors.

In block 641, a decision may be made as to whether or not the time-value pair meets a variable set of similarity criteria of the historic record of daylight events for the control device. As described above, this may include matching of sensor data, control data and other data within a comparison algorithm.

At block 650, devices that meet historic similarity criteria for daylight reduction may synchronize their operation to behave in unison. This may mean that the measured daylight readings used as an input to a PID control loop are averaged among all members of a functional association. It may also mean that only the daylight readings of one device are used as the measured value by all devices in their PID control loops.

A device that contains multiple sensors may belong to more than one functional association. For example, two devices can synchronize their operation in response to occupancy detection but not for daylight response. Functional associations may overlap each other or be nested in one another.

Moreover, the membership in the functional association may be dynamic. The device may share their historical time values periodically and re-evaluate their membership in the functional associations. If a new device is installed, it may add itself to functional associations Similarly if a device is relocated or if the layout of the space near the device is altered, the functional associations for the device may change. Such re-evaluation may take place periodically, such as once a daily, or once a week or in near real time, such as every second or minute.

The control devices may broadcast all its luminaire data regularly or broadcast current data more frequently and its historic data less frequently. Once luminaires have determined functional associations, the results of the associations, such as luminaire identifiers that have joined a group, may be communicated to a central controller, either from control device to control device in a peer-to-peer network or through a different network.

In addition, if a neighbouring device fails or is not responding to, or sending updated sensor information, a device may ignore or no longer rely on its sensor information to determine its state. For example, a device may ignore a daylight sensor in a PID control loop if the daylight sensor is no longer responding or generating useable information.

In comparison to a low voltage LMS, the approach described above has the advantage of not requiring dedicated wiring to define a functional association. With respect to a wired or wireless digital LMS configured by way of network addresses, this approach has the advantage of not relying exclusively on a network address or any programming by a user to define the functional association.

Tasks that may be inherently complex to implement in a digital, address based, LMS, such as programming functional associations in response to the position of a movable partition wall, may be done inherently by virtue of the dynamic nature of the functional associations and the periodic sharing of historical data between the devices.

A control device, or the system of luminaires may generate an identifier that can be shared with a LMS controller or operator. A controller or operator may use the identifier to re-configure, or override aspects of the functional association. For example, the controller or operator may re-assign a device to a different functional association, combined or split a functional association. In some instances, the controller or operator may re-configure the algorithm used to determine if devices are sufficiently similar to form a functional association. The controller or operator may be local to the luminaires or may be remote, such as at a municipal, regional or national control centre.

In some locations, regulations or use cases may require different functional associations and response parameters. For example, hold times may be different in bathrooms as compared to broom closets.

A control device that may contain some or all of an infrared communication circuitry (consisting of an emitter and a receiver), a set of environmental sensors (such as daylight and occupancy), and signal analysis and control logic processing capabilities. The control device may also have a mechanism to controls the state of an actuator such as an luminaire, a variable valve controller or other types of building automation appliances or equipment. The device can be part of, mounted on or adjacent to the unit it is controlling.

Multiple control devices may be installed throughout a building space, such as by being connected with or associated with each of the devices being controlled by the LMS. The device may not require line of sight to transmit messages on the (free space optical) FSO communication channel. The communication message would have sufficient signal to noise ratio to overcome sources of data corruption, such as natural sunlight.

Various embodiments of the present invention having been thus described in detail by way of example, it will be apparent to those skilled in the art that variations and modifications may be made without departing from the invention. The invention includes all such variations and modifications as fall within the scope of the appended claims.

I claim:

1. A control device for associating automation objects in groups comprising:
   a sensor for detecting current operating data;
   a memory for recording the sensor data, comprising current and historical operating data;
   a communications signal receiver that receives communications signals from one or more neighbouring control devices comprising current and historical operating data;
   a communications signal transmitter that transmits communications signals to the one or more neighbouring control devices comprising current and historical operating data;
   a control unit that compares the received one or more operating data with the recorded operating data and for each neighbouring control device determines the similarity of the operating data;
   an automation object output based on the current operating data and the control unit;
   wherein the control unit determines whether operation of the automation object output is coordinated with the current operating data of the neighbouring one or more control devices for which there is similarity.

2. The device of claim 1, whereby the communications signal transmitter is a diffuse link.

3. The device of claim 1, wherein the communications signal transmitter and the communications signals receiver transmit and receive identifiers of the one or more neighbouring devices.

4. The device of claim 1, wherein the communications signal transmitter and the communications signals receiver comprises a contention protocol to resolve communication errors or collisions that may occur.

5. The device of claim 1 wherein the control unit determine the similarity between recorded and received sensor data based on weighted historic values.

6. The device of claim 1 wherein the current operating data comprises occupancy data proximate to the automation object.

7. The device of claim 1 wherein the current operating data comprises ambient light level proximate to the automation object.

8. The device of claim 6 wherein comparing the received current and historical operating data with the recorded current and historical data comprises comparing the occupancy start and occupancy end times of the device with the occupancy start and occupancy end times of one or more neighbouring devices.

9. The device of claim 6 wherein the device turns on the automation object at the same time as the one or more neighbouring devices for which there is similarity when any one of the one or more neighbouring devices which there is similarity detects occupancy and during off the automation object when none of the one or more neighbouring devices which there is similarity detect occupancy.

10. A method for associating automation objects, each automation object having a control device, the method comprising:
    the control device sensing current operating data for the automation object;
    the control device recording the current operating data in memory;
    receiving a communications signal from one or more neighbouring control devices, the signal comprising current and historical operating data;
    transmitting a communications signals to one or more neighbouring control devices comprising current and historical data;
    comparing the received current and historical operating data with the recorded current and historical data and determining the similarity in the operating data;
    operating the automation object in coordination with the current operating data of the one or more neighbouring devices if there is similarity.

11. The method of claim 10 wherein the communications signals are a diffuse link.

12. The method of claim 10 wherein the communications signals further comprise unique identifiers for the automation object.

13. The method of claim 10 wherein the communications signals further comprise a contention protocol to resolve communication errors or collisions that may occur.

14. The method of claim 10 wherein determining the similarity in the operating data comprises comparing weighted historical values.

15. The method of claim 10 wherein the current operating data comprises the occupancy proximate to the automation object.

16. The method of claim 10 wherein the current operating data comprises the current ambient light level proximate to the automation object.

17. The method of claim 15 wherein comparing the received current and historical operating data with the recorded current and historical data comprises comparing the occupancy start and occupancy end times of the device with the occupancy start and occupancy end times of one or more neighbouring devices.

18. The method of claim 15 further comprising turning on the automation object at the same time as the one or more neighbouring devices for which there is similarity when any one of the one or more neighbouring devices which there is similarity detects occupancy and during off the automation object when none of the one or more neighbouring devices which there is similarity detect occupancy.

* * * * *